US009240124B2

(12) United States Patent
Hiruta et al.

(10) Patent No.: US 9,240,124 B2
(45) Date of Patent: Jan. 19, 2016

(54) TRAFFIC-VOLUME PREDICTION DEVICE AND METHOD

(75) Inventors: Tomoaki Hiruta, Tokyo (JP); Manabu Kato, Tokyo (JP); Mariko Okude, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/419,512

(22) PCT Filed: Aug. 8, 2012

(86) PCT No.: PCT/JP2012/070142

§ 371 (c)(1), (2), (4) Date: Feb. 4, 2015

(87) PCT Pub. No.: WO2014/024264

PCT Pub. Date: Feb. 13, 2014

(65) Prior Publication Data

US 2015/0179064 A1 Jun. 25, 2015

(51) Int. Cl.
*G01C 21/00* (2006.01)
*G08G 1/01* (2006.01)

(52) U.S. Cl.
CPC ............ *G08G 1/0129* (2013.01); *G08G 1/0112* (2013.01); *G08G 1/0141* (2013.01)

(58) Field of Classification Search
None
See application file for complete search history.

(56) References Cited

U.S. PATENT DOCUMENTS 7,233,861 B2 * 6/2007 Van Buer ........... G01C 21/3617 340/994
7,577,513 B2 * 8/2009 Kumagai ............. G08G 1/0104 340/906
7,788,027 B2 * 8/2010 Jones ..................... G01C 21/26 701/301
8,073,615 B2 * 12/2011 Kudoh ............... G01C 21/3617 701/426
8,126,641 B2 * 2/2012 Horvitz .............. G01C 21/3415 340/995.19
8,200,425 B2 * 6/2012 Overgoor ............... G01V 21/34 701/410
8,392,116 B2 * 3/2013 Lehmann ........... G01C 21/3438 340/991

(Continued)

FOREIGN PATENT DOCUMENTS

JP 2003-272083 A 9/2003
JP 2007-128121 A 5/2007

(Continued)

OTHER PUBLICATIONS

International Search Report (PCT/ISA/210) dated Nov. 13, 2012, with English translation (Five (5) pages).

(Continued)

*Primary Examiner* — Jonathan M Dager
(74) *Attorney, Agent, or Firm* — Crowell & Moring LLP

(57) ABSTRACT

Because a route selection model for traffic demand prediction of selecting a route from among travel routes in probe data cannot include other routes than the travel route in the probe data, it is not possible to predict a traffic volume on the route that has not been traveled. A traffic-volume prediction device includes a simple-network creation device that makes a simple network connecting principal intersections extracted from travelling loci in the collected probe data, a model creation device that determines a utility between the principal intersections based on the data of the travelling loci and calculates a selection probability for each principal intersection based on the utility, and a traffic-volume assignment device that distributes a traffic volume to the routes between the principal intersections according to the selection probability and uses the traffic volume for each route candidate to be a traffic demand prediction object.

8 Claims, 6 Drawing Sheets

(56) References Cited

U.S. PATENT DOCUMENTS

| | | | | |
|---|---|---|---|---|
| 8,412,445 | B2 * | 4/2013 | Uyeki | G08G 1/096827 701/117 |
| 8,768,616 | B2 * | 7/2014 | Kristinsson | G01C 21/3617 701/424 |
| 2002/0161517 | A1 * | 10/2002 | Yano | G01C 21/3407 701/420 |
| 2002/0198694 | A1 * | 12/2002 | Yang | G06F 17/5009 703/6 |
| 2004/0128066 | A1 * | 7/2004 | Kudo | G01C 21/3617 701/468 |
| 2005/0075119 | A1 * | 4/2005 | Sheha et al. | G01C 21/26 455/456.6 |
| 2006/0025925 | A1 * | 2/2006 | Fushiki | G01C 21/26 701/423 |
| 2006/0122846 | A1 * | 6/2006 | Burr | G01C 21/3492 342/357.31 |
| 2006/0158330 | A1 * | 7/2006 | Gueziec | G01C 21/3492 340/539.13 |
| 2006/0173841 | A1 * | 8/2006 | Bill | G01C 21/3407 1/1 |
| 2007/0010942 | A1 * | 1/2007 | Bill | G01C 21/3679 701/424 |
| 2007/0150174 | A1 * | 6/2007 | Seymour | G01C 21/3617 701/532 |
| 2007/0195700 | A1 * | 8/2007 | Katoh | H04L 12/2602 370/235 |
| 2007/0208492 | A1 * | 9/2007 | Downs | G08G 1/0104 701/117 |
| 2008/0071465 | A1 * | 3/2008 | Chapman | G01C 21/3691 701/117 |
| 2008/0071466 | A1 * | 3/2008 | Downs | G08G 1/0104 701/117 |
| 2008/0180705 | A1 | 7/2008 | Hosaki | |
| 2009/0088965 | A1 * | 4/2009 | Burckart | G01C 31/3492 701/533 |
| 2009/0105940 | A1 * | 4/2009 | Bitan | G01C 21/3492 701/533 |
| 2009/0138187 | A1 * | 5/2009 | Mathias | G08G 1/08 701/117 |
| 2010/0036601 | A1 * | 2/2010 | Ozawa | G01C 21/00 701/465 |
| 2010/0106603 | A1 * | 4/2010 | Dey | G01C 21/3484 705/14.63 |
| 2012/0072096 | A1 * | 3/2012 | Chapman | G08G 1/0133 701/118 |
| 2012/0179363 | A1 * | 7/2012 | Pierfelice | G01C 21/3461 701/423 |
| 2013/0103300 | A1 * | 4/2013 | Rakthanmanon | G01C 21/3484 701/408 |
| 2013/0138331 | A1 * | 5/2013 | Lynar | G08G 1/0112 701/117 |
| 2013/0166096 | A1 * | 6/2013 | Jotanovic | G01C 21/3617 701/1 |
| 2013/0173150 | A1 * | 7/2013 | Ghisio | G01C 21/26 701/423 |

FOREIGN PATENT DOCUMENTS

| | | |
|---|---|---|
| JP | 2007-187514 A | 7/2007 |
| JP | 2010-191890 A | 9/2010 |

OTHER PUBLICATIONS

Miwa, et al. "The Model Analysis on Route choice behavior based on Probe-Car Data", Japan Society of Civil Engineers, vol. 21, No. 2, 2004, with partial English translation (Nine (9) pages).

* cited by examiner

| 21 VEHICLE ID | 22 START-POINT NODE ID | 23 END-POINT NODE ID | 24 INCOMING TIME | 25 TRIP TIME | 26 TRAVEL DISTANCE |
|---|---|---|---|---|---|
| 001 | 53393500001 | 53393500002 | 10:00 | 5 MIN. | 1km |
| ⋮ | ⋮ | ⋮ | ⋮ | ⋮ | ⋮ |

TRAFFIC-VOLUME PREDICTION DEVICE AND METHOD

BACKGROUND OF THE INVENTION

The present invention relates to a traffic-volume prediction device, and specifically to a traffic-volume prediction device that predicts a traffic volume between two points using a collected travel history of a vehicle.

BACKGROUND ART

In order to predict a traffic demand, a route selection model is required. The route selection model is a model for calculating a selection probability for each route using a factor such as a required time and distance for the route assuming that a driver should act based on a reasonable selection rule by which the most desirable route is selected from among an available route group from an origin point to a destination point. A traffic volume on the route is predicted using the selection probability for each route. To create the route selection model, the route group must be prepared in advance.

Nonpatent Literature 1 describes a technology of using probe data to create the route group for the route selection model. Because the probe data can specify a travel route of a vehicle, it is easy to create the route group. Furthermore, the route group includes all the routes that a probe car has traveled from the origin point to the destination point.

CITATION LIST

Nonpatent Literature

Nonpatent Literature 1: "The Model Analysis on Route choice behavior based on Probe-Car Data," Journal of Japan Society of Civil Engineers, No. 21 (2), September 2004.

When selecting a route from an origin point to a destination point, a driver selects the route believed to be the most desirable from among a route group in the driver's mind. The travel route in the probe data merely indicates the result of selection but does not include a sufficient route group. That is, with the technology described in Nonpatent Literature 1, the route group cannot include other routes than the route from the origin point to the destination point in the probe data. Thus, it is not possible to calculate the traffic volume on the route that has not been traveled.

BRIEF SUMMARY OF THE INVENTION

To solve the above problem, a traffic-volume prediction device according to the present invention includes a simple-network creation device that makes a simple network connecting principal intersections with high travel frequency extracted from travelling loci in the collected probe data, a model creation device that determines a utility between the principal intersections based on the data of the travelling loci and calculates a selection probability for each principal intersection based on the utility, and a traffic-volume assignment device that distributes a traffic volume to the routes between the principal intersections according to the selection probability and uses it as the traffic volume for each route candidate to be a traffic demand prediction object.

According to the invention, because the networks among the principal intersections on the simple network can be combined based on the selection probability, even the traffic volume on the route which has not been traveled can be predicted.

DETAILED DESCRIPTION OF THE INVENTION

Embodiments of a traffic-demand prediction system based on the present invention will be described with reference to drawings.

Figures 1, 2:
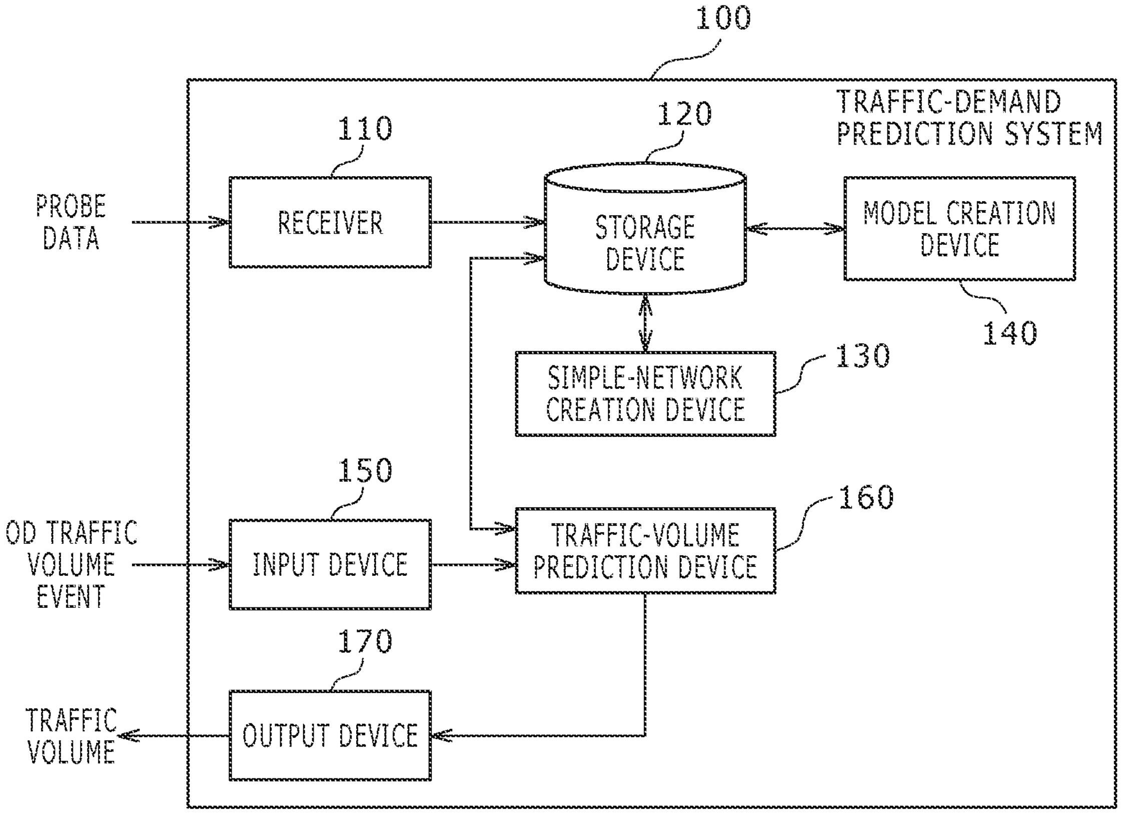
FIG. 1 is a block diagram showing a general configuration of a traffic-demand prediction system according to the present invention.
FIG. 2 is a diagram showing a data format of probe data.

A general configuration of the traffic-demand prediction system according to an embodiment of the present invention is shown in FIG. 1. The traffic-demand prediction system 100 shown in FIG. 1 is constituted by a receiver 110, a storage device 120, a simple-network creation device 130, a model creation device 140, an input device 150, a traffic-volume prediction device 160, and an output device 170. The receiver 110, the simple-network creation device 130, the model creation device 140, the input device 150, and the traffic-volume prediction device 160 may be a software executed by an unshown microprocessor, RAM, ROM, or the like mounted on the traffic-demand prediction system 100.

The receiver 110 receives probe data from a probe center that collects and manages travel information from the vehicle, and stores the data in the storage device 120. The probe data is constituted by an identification ID of the vehicle (hereinafter, vehicle ID), position information including a start-point/end-point node that identifies the road traveled by the vehicle in units of links (segments), time information during which the vehicle travels on the link, trip time information indicative of the time required for passing the link, travel distance information indicative of the distance by which the vehicle travels on the link, and the like. The vehicle uplinks the vehicle ID, the position information indicative of the traveling position of the vehicle, the time information indicative of the time at which the vehicle travels there, and the travel distance information to the probe center. The vehicle that provides such travel information is referred to as a probe car. The probe center identifies the road on which the vehicle travels using the position information and the time information from among the travel information collected from the probe car and map information loaded in the probe center. The probe data received by the receiver 110 is the data processed by the probe center.

The storage device 120 is constituted by a storage device such as a hard disk, a flash memory, and the like, and stores therein the probe data, the simple network data, and the selection model data. The probe data is input from the receiver 110. The simple network data is input from the simple-network creation device 130. The selection model data is input from the model creation device 140.

A format of the probe data received by the receiver 110 is shown in FIG. 2. The probe data is constituted by a vehicle ID (21) for identifying the vehicle that collects the probe data, a start-point node ID (22) and an end-point node ID (23) of the road for identifying the road for which the probe data is collected, an incoming time (24) at which the vehicle entered the road, a trip time (25) at which the vehicle travels the road, and a travel distance (26).

The simple-network creation device 130 extracts the principal intersections using the probe data in the storage device 120, and creates a simple network connecting the principal intersections. The created simple network data is stored in the storage device 120. The simple-network creation device 130 will be described in detail below.

The model creation device 140 calculates a utility function of each principal intersection using the probe data and the simple network data in the storage device 120. The utility function is a function in which, generally for two arbitrary selection objects, a preference relationship indicative of preferring one selection object to the other equals a magnitude relationship based on a value of a function indicative of the utility (or value) of the selection objects, and it indicates herein the relationship among the factors of time, distance, and the like between the principal intersections and the utility between the principal intersections. The created data of the utility function is stored in the storage device 120 as the selection model data. The model creation device 140 will be described in detail below.

The input device 150 inputs, from a user or an external center, an origin point and a destination point of a traffic volume estimation object, a traffic volume from the origin point to the destination point (hereinafter, OD traffic volume), and event information assumed between the origin point and the destination point. The traffic-demand prediction system 100 is used to predict a change in the traffic volume when a certain event occurs. As conditions for the prediction, an objective area of the origin point and the destination point, the OD traffic volume, and the assumed event information are input by the input device 150. The input information is provided to the traffic-volume prediction device 160. The input device 150 will be described in detail below.

The traffic-volume prediction device 160 predicts the traffic volume when the event occurs using the conditions input by the input device 150 and the simple network data and the selection model data in the storage device 120. The predicted traffic volume is provided to the output device 170. The traffic-volume prediction device 160 will be described in detail below.

The output device 170 outputs the predicted traffic volume from the traffic-volume prediction device 160 to the user or the external center. The output device 170 will be described in detail below.

Figure 3:
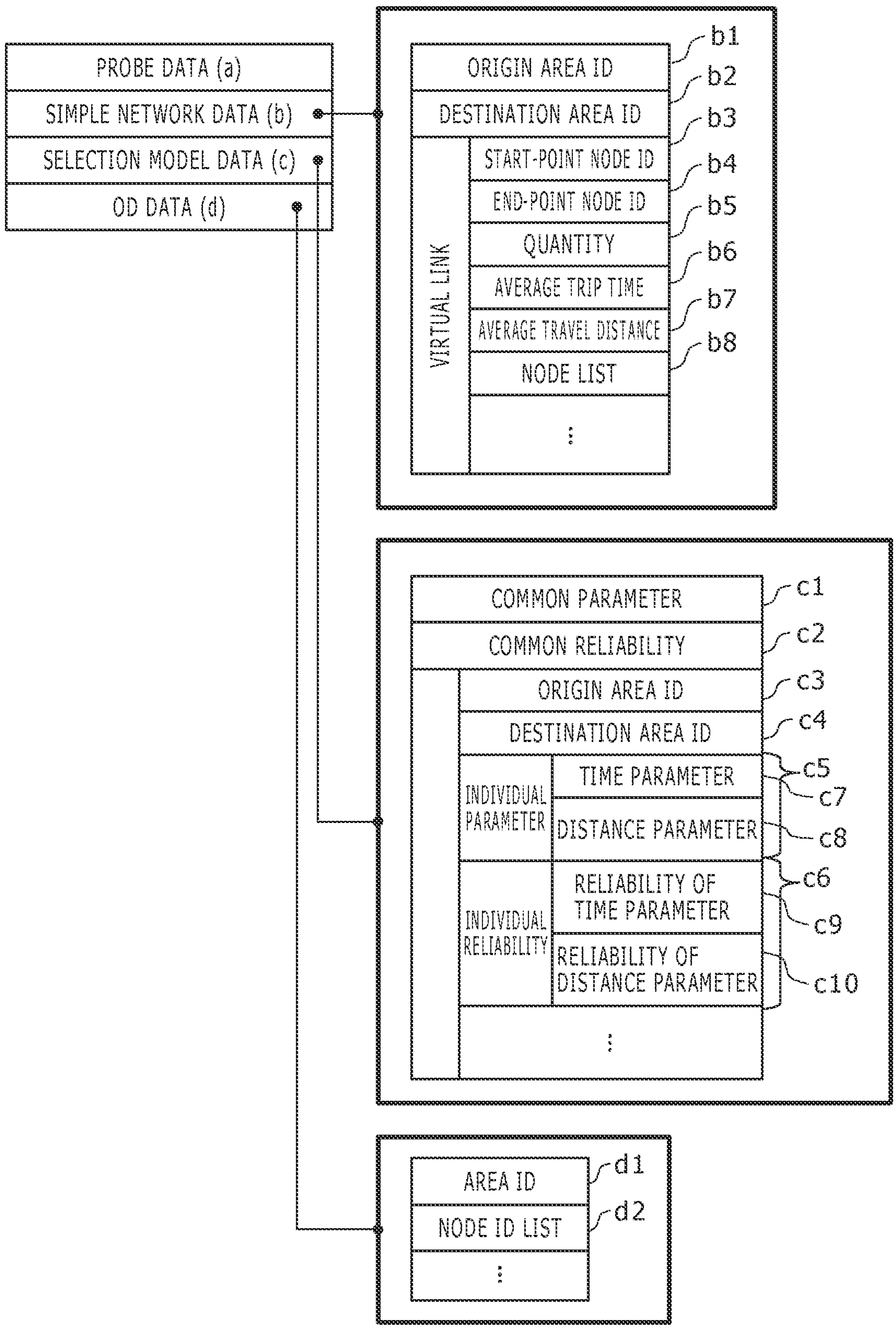
FIG. 3 is a diagram showing a data format in a storage device 120.

Next, the storage device 120 is described in detail. The data format of various data stored in the storage device 120 is shown in FIG. 3. The storage device 120 stores therein probe data (a), simple network data (b), selection model data (c), and OD data (d). The data format of the probe data (a) is identical to the format of the probe data received by the receiver 110 (FIG. 2).

The simple network data (b) is constituted by, with respect to each combination of an origin point (b1) and a destination point (b2), a node ID (b3) of the principal intersection as a start point, a node ID (b4) of the principal intersection as an end point, a quantity (b5) of the probe cars that passed between the principal intersections, an average trip time (b6) and an average travel distance (b7) after passing between the principal intersections until arriving at the destination point, and a list (b8) of node IDs included between the principal intersections. The simple network data (b) is created by the simple-network creation device 130.

The selection model data (c) represents a parameter and its reliability in a route selection model, and is created by the model creation device 140. The selection model data (c) is constituted by common data independent of the origin point and the destination point and individual data with respect to each origin point and destination point. The common data independent of the origin point and the destination point is constituted by a common parameter (c1) indicative of a route selection model representing a selection behavior of a route from among various combinations of the origin point and the destination point and a common reliability (c2) indicative of the reliability of the parameter. The data for each origin point and destination point is constituted by an origin area ID (c3) indicative of the area ID of the origin point, a destination area ID (c4) indicative of the area ID of the destination point, an individual parameter (c5) indicative of the individual parameter in the route selection model, and an individual reliability (c6) indicative of the reliability of the individual parameter. If each combination of the origin point and destination point has a plurality of parameters of the model created by the model creation device 140, it generally has a plurality of values as the common parameters (c1) common to respective ones and the individual parameters (c5). Accordingly, there are also a plurality of common parameters (c1) and individual parameters (c5) as the parameter of the route selection model. The reliability of the parameter is an index indicative of how reliable the parameter is, and it corresponds one-to-one with the parameter.

When the parameters (c1, c5) of the route selection model are time and distance, for example the individual parameter (c5) is constituted by a time parameter (c7) and a distance parameter (c8), and the individual reliability is constituted by a reliability (c9) of the time parameter and a reliability (c10) of the distance parameter.

The OD data (d) includes information regarding the origin point and the destination point for the traffic demand prediction. The OD data (d) is constituted by an area ID (d1) identifying the area defined for the origin point or the destination point and a node ID list (d2) included in the area. For example, when it is desired to predict the traffic demand between areas in administrative units such as in a municipal level, the areas of the origin point and the destination point may be defined in the administrative units like municipal units such as "Hitachi City," "Mito City," and the like. In this case, the node ID list (d2) of the administrative unit to be the origin point or the destination point, for example Hitachi City, is a list consisting of node IDs present in the range of Hitachi City that is the administrative unit. The data is created by the model creation device 140. The OD data (d) is created in advance of the server shipment or created at regular time intervals.

Figure 4:
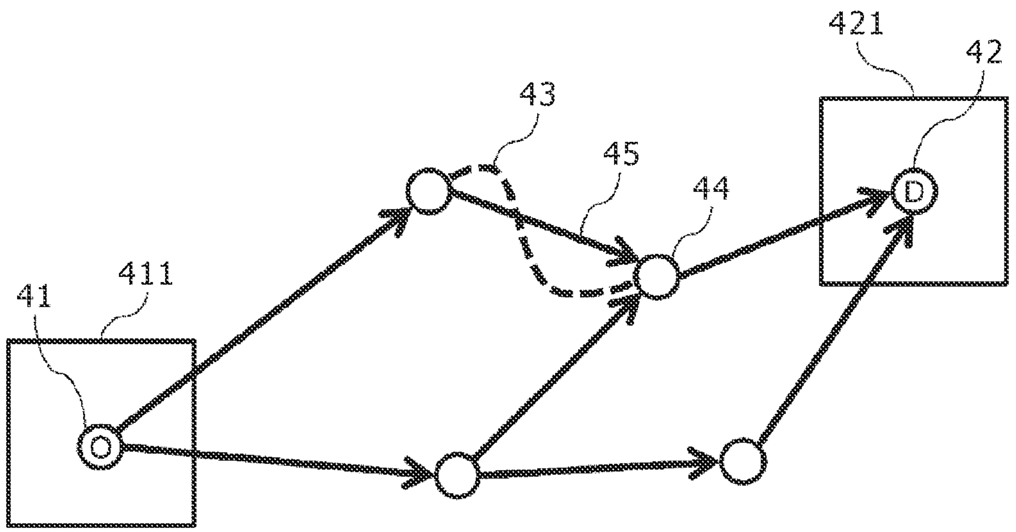
FIG. 4 is an example of a simple network created by a simple-network creation device 130.

Next, the simple-network creation device 130 is described in detail. FIG. 4 shows an example of the simple network. The sizes of the origin point (41) and the destination point (42)

may vary depending on the purpose of the traffic demand prediction. For example, when it is desired to predict the traffic demand at the municipal level, the origin point and the destination point should be defined in municipal units such as Hitachi City and Mito City. Hereinafter, the origin point and the destination point are defined by the mesh in the map. The probe data of the traveling from the origin point (41) to the destination point (42) is extracted from the storage device 120, and a principal intersection (44) is extracted from the intersections with a higher traffic volume based on a travel history (43) of the extracted probe data.

Then, the principal intersections (44) present in the section where the probe car actually travels are connected to one another, and a virtual link (45) corresponding to the link of the traveled section (principal intersections are set as the start point/end point) is created, whereby the simple network indicative of the section where the probe car actually travels from the origin point (41) to the destination point (42) can be created. It should be noted that the virtual link is not necessarily an existing road but is a line segment connecting the principal intersections at both ends of the actually traveled road (43).

Figure 5:
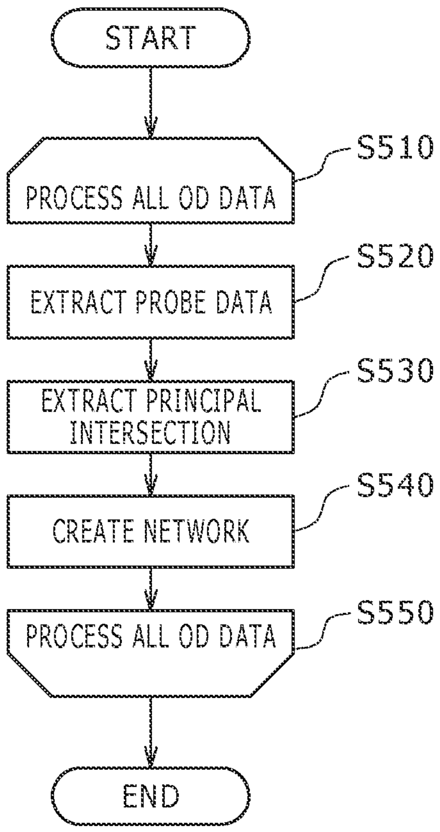
FIG. 5 is a flowchart showing a processing flow of the simple-network creation device 130.

Next, a processing flow of the simple-network creation device 130 is described with reference to FIG. 5. The simple-network creation device 130 processes the probe data (a) accumulated in the storage device 120 with a regular cycle such as every month or every year. Each step is described in detail below.

At Step S510, processing of repeating Steps S520 to S540 on all the combinations of the area IDs stored as the OD data (d) in the storage device 120 is started. In this case, one of the area IDs stored as the OD data (d) in the stored information 120 is used as the origin point, and one of the area IDs other than the area ID of the origin point among the area IDs stored as the OD data (d) is used as the destination point. Thus, when n areas are defined, the number of the total combinations of the area IDs of the origin point and the destination point is $n \times (n-1)$. For all the combinations of the area IDs of the origin point and the destination point thus calculated, the following loop processing is performed.

At Step S520, the probe data of the traveling from the origin point to the destination point as determined at Step S510 is extracted from the probe data (a) in the storage device 120. If there is no objective probe data of the traveling from the origin point to the destination point, the subsequent processing of the principal intersection extraction step S530 and the network creation step S540 is substantially skipped, but the processing flow in FIG. 5 shows the flow of the processing in a simplified manner.

At step S530, the principal intersection is extracted using the probe data extracted at Step S520. The principal intersection means an intersection with a high travel frequency of the probe car, with a high traffic volume coming into the intersection, and with the incoming traffic volume widely dispersing to a plurality of roads connected to the intersection but not going out intensively to a certain road. In the processing of obtaining such a principal intersection, a degree of branching of the traffic volume coming into each intersection is calculated using the probe data extracted at Step S520. A quantitative index indicative of the degree of branching is defined as a branching degree. An intersection with a high branching degree means that the probe car coming into the intersection can easily travel into various roads at the intersection.

The branching degree is created with respect to each node coming into the intersection. The branching degree is defined as an incoming quantity divided by the maximum outgoing quantity. Consider a case in which, for example, the intersection comes from a node ID "001" to node IDs "002," "003," and "004". It is assumed that the vehicle quantity coming into the intersection from the node ID "001" is 100, the vehicle quantity going out to the node "002" is 50, the vehicle quantity going out to the node "003" is 30, and the vehicle quantity going out to the node "004" is 20. Because the maximum outgoing quantity is 50 at the node "002," the branching degree is 2.0 (100/50). On the contrary, in a case where vehicles do not proceed to branched ways, assuming that the outgoing quantity to the node ID "002" is 100 and the outgoing quantity to other node IDs is 0, the branching degree is 1.0 (100/100).

As described above, the degree of branching at an intersection can be evaluated based on the branching degree. The branching degree is created in units of incoming nodes at each intersection node. Using a threshold of the branching degree set in advance, a combination of an intersection node and an incoming node no lower than the threshold is defined as the principal intersection.

At Step S540, the probe data of the traveling between the principal intersections extracted at Step S530 is extracted from the probe data extracted at Step S520. The probe data of the travelling at the principal intersections is extracted and the virtual link is created between the principal intersections. After creating the virtual link, the quantity (b5) of the probe car traveling between the principal intersections, a value of the average trip time (b6) point and a value of the average travel distance (b7) to the destination, as obtained from the probe data with respect to each virtual link, are written to the simple network data (b) in the storage device 120. Moreover, the area ID of the origin point and the area ID of the destination point determined at Step S510 are written as the origin area ID (b1) and the destination area ID (b2), respectively, the node ID of the principal intersection to be the start point of the virtual link (start-point principal intersection) is written as the start-point node ID (b3), the node ID of the principal intersection to be the end point of the virtual link (end-point principal intersection) is written as the end-point node ID (b4), and the list of the node IDs between the principal intersections obtained from the probe data is written as the node list (b8), all to the simple network data (b) in the storage device 120. The node list (b8) includes the node IDs of all the nodes passed between the principal intersections in the probe data of the passage from the start-point principal intersection to the end-point principal intersection on the virtual link.

At Step S550, it is determined whether the processing is completed for all the combinations of the origin point and the destination point, and the processing flow is terminated when the processing is completed. When the processing is not completed for all the combinations of the origin point and the destination point, the process continues the loop processing of returning to Step S510.

Figure 6:
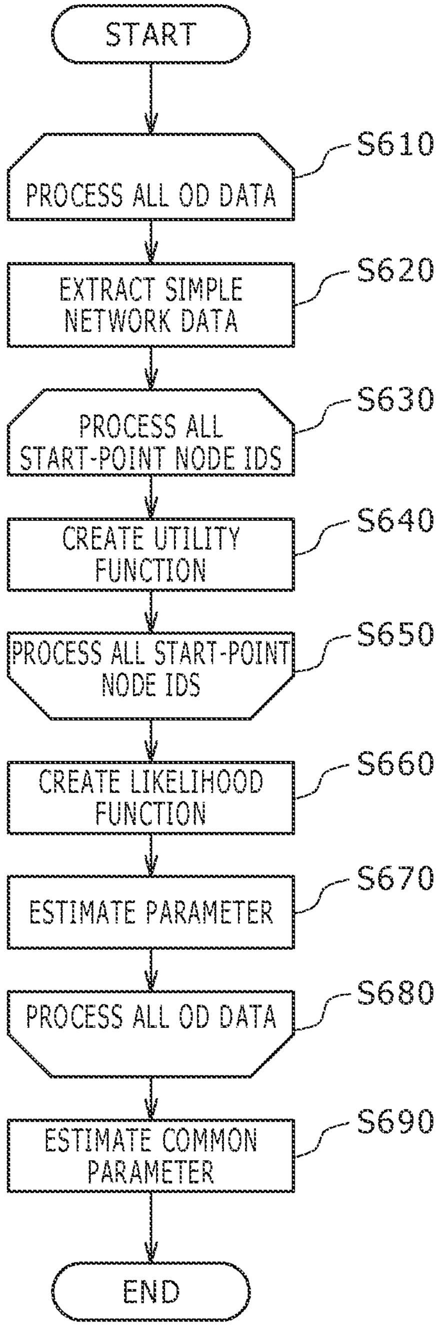
FIG. 6 is a flowchart showing a processing flow of a model creation device 140.

Next, a processing flow of the model creation device 140 is described with reference to FIG. 6. The model creation device 140 performs the processing of generating a parameter describing a route selection model using the probe data (a) and the simple network data (b) in the storage device 120 after the termination of the processing by the simple-network creation device 130.

When there are a plurality of virtual links connected to the principal intersection to be the start point, it is assumed that the vehicle calculates the utility of each virtual link based on the property of the virtual link and selects the virtual link based on the utility for traveling. A formula associating the property of the virtual link with the utility is the utility function. The utility function is an evaluation function for calculating a selection probability of the virtual link, which evaluates an attractiveness of the route between the virtual links felt by a driver (vehicle), in which a high attractiveness felt means a high selection probability of the virtual link.

The property of the virtual link may be the average trip time (b6) and the average travel distance (b7) in the simple network data (b) in the storage device 120. In this case, the start-point node ID of the start-point principal intersection is designated as "i," and the end-point node ID of the end-point principal intersection in the virtual link connected to the start-point principal intersection node ID "i" is designated as "j." The utility of the virtual link "ij" defined by the start-point node ID "i" and the end-point node ID "j" is designated as "Vij." The average trip time (b6) of the virtual link "ij" is designated as "Tij," and the average travel distance (b7) of the virtual link "ij" is designated as "Lij." Furthermore, the parameter of the trip time in the utility function is designated as "θtij" and the parameter of the travel distance in the utility function is designated as "θlij," and thus the utility function is defined by (Formula 1).

$$Vij=\theta tij\times Tij+\theta lij\times Lij \quad \text{(Formula 1)}$$

The utility function is set by a system manufacturer or a user in advance. Therefore, in addition to (Formula 1), other properties such as a cost including toll fare and a road width may be taken into consideration.

The model creation device 140 estimates the parameter of the utility function, and stores the estimated result in the selection model data (c) in the storage device 120 as the parameter of the route selection model. The parameter of the selection model is created with respect to each combination of the origin area and the destination area. That is, once the origin area and the destination area are determined, there is only one parameter. The parameter is estimated with respect to each combination of the origin area and the destination area in Steps S610 to S680. However, depending on the combination of the origin area and the destination area, the reliability of the parameter may be low due to the small number of samples in the probe data. Therefore, a common parameter is estimated using all the probe data without depending on the combination of the origin area and the destination area. The common parameter is used as an alternative when the reliability of the parameter of the origin area and the destination area is too low. This process is performed at Step S690.

Next, steps in the processing flow of the model creation device 140 are described in detail.

At Step S610, the processing of repeating Steps S620 to S670 on all the combinations of the area IDs stored in the OD data (d) in the storage device 120 is started. In this case, like Step S510, the combination of the origin area ID and the destination are ID is determined using one of the area IDs in the OD data (d) in the storage device 120 as the origin point and one of the area IDs other than the area ID of the origin point as the destination point. Assuming that n area IDs are defined in the OD data (d) in the storage device 120, the number of the total combinations is n×(n−1).

At Step S620, the simple network data corresponding to the origin area ID and the destination area ID determined at Step S610 is extracted from the simple network data (b) in the storage device 120.

At Step S630, the processing of Step S640 is repeated for all the start-point node IDs (d3) in the simple network data (b) extracted at Step S620.

At Step S640, the utility function is created by extracting the simple network data (b) including the start-point node ID (d3) subjected to the loop processing at Step S630 and setting the extracted data to the formula of the utility function defined by (Formula 1).

At Step S650, it is determined whether the processing is completed for all the start-point node IDs, and the process proceeds to Step S660 when the processing is completed. When the processing is not completed for all the start-point node IDs, the process returns to Step S630.

At Step S660, a likelihood function is created using the utility function created at Step S640. One likelihood function is created for every combination of the area IDs used at Step S610. Assuming the traveling quantity (b5) of the probe car on the virtual link "ij" as "nij," the likelihood function Li of the start-point node ID "i" is expressed as a sum of all the principal intersection nodes "j" connected to the principal intersection node "i" as indicated by (Formula 2).

$$Li=\Sigma(nij\times\log(Pij)) \quad \text{(Formula 2)}$$

"Pij" represents the probability of selecting the virtual link "ij," which is calculated as indicated by (Formula 3) using the utility "Vij" in (Formula 1).

$$Pij=exp(Vij)/\Sigma exp(Vij), \quad \text{(Formula 3)}$$

where exp( ) is an exponential function.

Furthermore, the likelihood function "Lod" with respect to each combination of area IDs is expressed by (Formula 4) for summing all the likelihoods of the principal intersection nodes "i" between the origin point and the destination point.

$$Lod=\Sigma Li \quad \text{(Formula 4)}$$

At Step S670, the parameters "θtij" and "θlij" in (Formula 1) are estimated so that the likelihood function Lod created at Step S660 reaches its maximum. For this estimation method, an existing maximum likelihood estimation method is used. Next, the parameter obtained by the maximum likelihood estimation is stored in a site corresponding to the combination of the area IDs at Step S610 in the selection model data (c) in the storage device 120. Specifically, the parameter "θtij" of the trip time is stored in the time parameter (c7) of the selection model data (c) in the storage device 120, and the parameter "θlij" of the distance is stored in the distance parameter (c8) of the selection model data (c) in the storage device 120.

The reliability of the estimated parameter is also obtained. The reliability may be a t-value indicative of a statistic reliability calculated by the maximum likelihood estimation method, or may be the quantity (Ni=Σnij) of the probe cars used to estimate the parameter. The calculated reliability is stored in the individual reliability (c6) of the selection model data (c) in the storage device 120.

At Step S680, it is determined whether the processing is completed for all the combinations of the area IDs stored in the OD data (d) in the storage device 120, and the process proceeds to Step S690 when the processing is completed. When the processing is not completed for all the combinations of the area IDs, the process returns to Step S610.

At Step S690, the parameter independent of the combination of the area IDs is estimated. Specifically, the parameter based on the common likelihood is obtained other than the parameter obtained for each combination of the area IDs by estimating the parameter using the existing maximum likelihood estimation method so that the summation of the likelihood function "Lod" with respect to each combination of the area IDs reaches its maximum. The estimated parameter is stored in the common parameter (c1). Similarly, the reliability of the parameter is obtained as in the case of the individual reliability, and stored in the common reliability (c2).

Thus, by obtaining the parameter with respect to each combination of the origin point and the destination point, it is possible to obtain the parameter reflecting the regional difference, which improves an accuracy of the route selection model. On the other hand, because such an estimation of the parameter requires a large size of the probe data, when the sample size of the probe data is small, the parameter independent of the combination of the area IDs is obtained using all the probe data so that the summation of the likelihood functions "Lod" with respect to each combination of the area IDs reaches its maximum, thereby preventing degradation of the accuracy.

Figure 7:
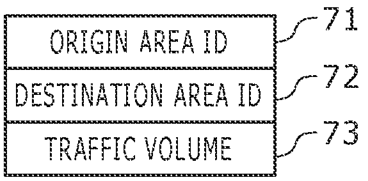
FIG. 7 is a diagram showing a data format of OD traffic volume information.

Next, the input device 150 is described in detail. The input device 150 receives OD traffic volume information and event information of the traffic volume estimation object input thereto. The input is performed by a user or an external server. The data format of the OD traffic volume information input to the input device 150 is shown in FIG. 7. The OD traffic volume information is constituted by an origin area ID (71) indicative of an area ID for identifying the origin point and a destination area ID (72) indicative of an area ID for identifying the destination point as information of the origin point and the destination point, and a traffic volume 73 that moves from the origin point to the destination point.

Figure 8:
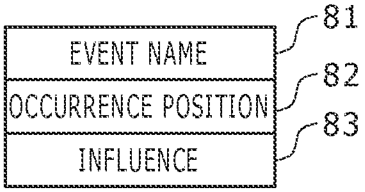
FIG. 8 is a diagram showing a data format of event information.

The data format of the event information input from the input device 150 is shown in FIG. 8. The event information is constituted by an event name (81) for identifying the event, an occurrence position (82) of the event, and influence (83) after occurrence of the event. One example of the event name (81) may be "construction." The occurrence position (82) describes the start-point node ID and the end-point node ID for identifying the node ID and the road where the event occurs. When the event straddles a plurality of nodes, a plurality of node IDs are described. The influence (83) after occurrence of the event indicates the change in the traffic condition at the event occurrence position when the event occurs. For example, it is assumed that, when the construction is conducted, the transit time may increase by two times on the road under construction. In such a case, the event information is described with "construction" in the event name (81), the start-point node ID and the end-point node ID in the occurrence position (82), and "two-times transit time" in the influence (83) after occurrence of the event at the construction section. Moreover, when performing road pricing that charges a driver when traveling the road, the event information is input with such data as "road pricing" as the name of the event (81), the start-point node ID and the end-point node ID of the road pricing target road as the occurrence position (82) of the event, and "100-yen charged" as the influence (83) after occurrence of the event.

Figure 9:
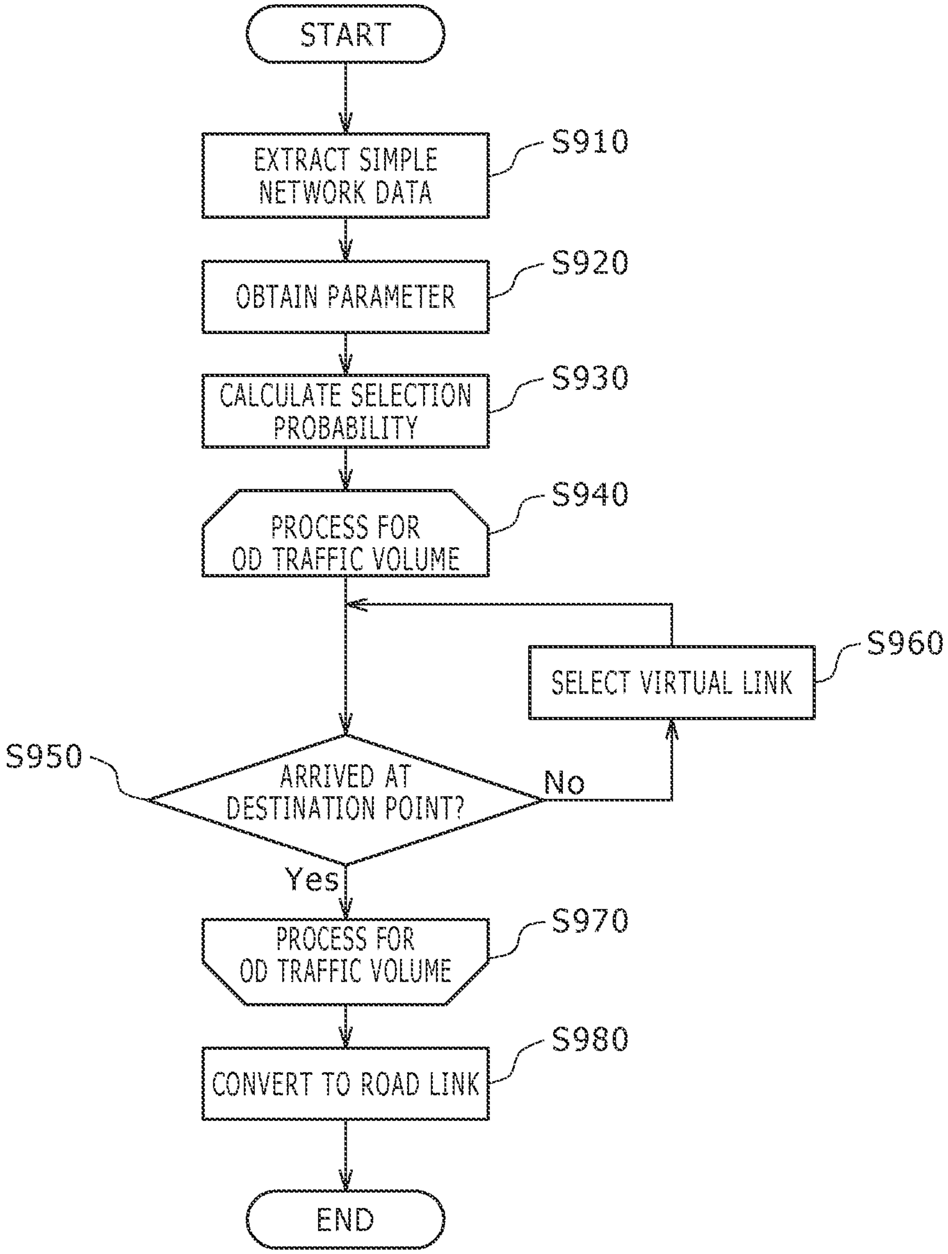
FIG. 9 is a flowchart showing a processing flow of a traffic-volume prediction device 160.

Next, the traffic-volume prediction device 160 is described in detail. The traffic-volume prediction device 160 predicts the traffic volume on the road after occurrence of the event using the simple network data (b) and the selection model data (c) in the storage device 120, and the OD traffic volume information and the event information input via the input device 150. The processing flow of the traffic-volume prediction device 160 is described with reference to FIG. 9. The traffic-volume prediction device 160 performs the processing based on the OD traffic volume information and the event information input from the input device 150.

First, at Step S910, the simple network data (b) corresponding to the combination of the origin area ID (71) and the destination area ID (72) in the OD traffic volume information from the input device 150 is obtained from the storage device 120. At Step S920, the parameter of the selection model data (c) corresponding to the combination of the origin area ID (71) and the destination area ID (72) in the OD traffic volume information from the input device 150 is obtained from the storage device 120. At this time, the individual parameter (c5) with respect to each origin area ID (c3) and each destination area ID (c4) is obtained. However, when the individual reliability (c6) of the individual parameter (c5) is lower than the threshold set in advance, the common parameter (c1) is obtained.

At Step S930, the selection probability of the virtual link connected to the principal intersection node is calculated with respect to each principal intersection node included in the simple network expressed by the simple network data (b) obtained at Step S910 using the event information from the input device 150. As in the aforementioned example, it is assumed that the event information is "construction," the occurrence position of the event is the road from the start-point node ID "001" to the end-point node ID "002," and as a result of the occurrence of the event, the time required from the start-point node ID "001" to the end-point node ID "002" increases by two times. A virtual link including both the start-point node ID "001" and the end-point node ID "002" in the node list (b8) in the extracted simple network data (b) is searched for. When there is no virtual link including the event position, the selection probability of each virtual link is calculated without reflecting the influence of two-times required time indicative of the influence in the event information.

When there is such a virtual link that includes the occurrence position of the event in the node list (b8), each selection probability is calculated reflecting the influence of the two-time required time indicative of the influence in the event information. Specifically, the utility of each virtual link is first calculated using (Formula 1). At this time, when the virtual link includes the occurrence position of the event in the node list (b8), the influence of the event is reflected by increasing the trip time "Tij" by two times. Then, the selection probability of each virtual link is calculated for all the virtual links in the simple network data between the origin point and the destination point using (Formula 3) based on the utility calculated for each virtual link.

At Step S940, the loop processing of repeating the processing from Step S950 to Step S960 is started for the traffic volume (73) set to the OD traffic volume information by the input device 150. For example, when the traffic volume is 100, the processing from Step S950 to Step S960 is repeated 100 times. This processing calculates the traffic volume with respect to each virtual link by performing a simulation in which the same number of vehicles as the traffic volume run on the simple network. In the travel simulation of the vehicle, the vehicle runs while selecting the virtual link according to the selection probability calculated at Step S930.

At Step S950, it is determined whether the vehicle simulated for traveling at Step S940 has arrived at the destination point area. If it has arrived at the destination point area (S950: Yes), it is assumed that the vehicle under processing reached from the origin point area to the destination point area, and the process proceeds to Step S970.

If the vehicle has not arrived at the destination point area (S950: No), the process proceeds to Step S960.

At Step S960, the virtual link connected to the principal intersection node in the simple network to which the vehicle has now arrived is extracted, and the virtual link on which the vehicle should proceed is selected using the selection probability calculated at Step S930. The virtual link should be selected at random based on the selection probability. The position of the vehicle under simulation is advanced to the selected principal intersection node of the end point of the virtual link. At this time, the traveled vehicle quantity is stored in a temporary storage device with respect to each virtual link.

At Step S970, it is determined whether the processing is completed for the traffic volume between the set origin and destination, and the process proceeds to Step S970 when the processing is completed. When the processing is not completed for the OD traffic volume, the process returns to Step S940.

At Step S980, the information on the traffic volume on each virtual link in the simple network stored in the temporary storage device at Step S960 is obtained and provided to the output device 170. Moreover, the traffic volume on the virtual link is converted to the traffic volume on the actual road link corresponding to the virtual link. Specifically, the traffic volume on the virtual link is converted to that on the corresponding road link as it is using the node list (b8) in the simple network data (b) in the storage device 120. However, when the virtual link does not correspond one-to-one with the road link column in between, the travel frequencies in a plurality of the road link columns corresponding to the virtual link are stored, and the traffic volume is assigned to each road link column based on weighted averaging of the travel frequencies. After the conversion, the information on the traffic volume in units of road links is output to the output device 170.

Figure 10:
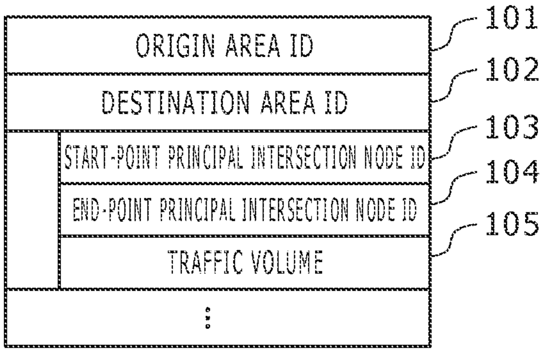
FIG. 10 is a diagram showing a data format of a traffic volume in units of virtual links.

Next, the output device 170 is described in detail. The output device 170 transmits the traffic volume in units of virtual links and the traffic volume in units of road links input from the traffic-volume prediction device 160 to the external server and an in-vehicle terminal. The data format of the traffic volume in units of virtual links is shown in FIG. 10. The virtual link traffic volume is constituted by an origin area ID (101) indicative of an area ID for identifying the origin point, a destination area ID (102) indicative of an area ID for identifying the destination point, and the traffic volume with respect to each virtual link. The traffic volume with respect to each virtual link is constituted by a start-point principal intersection node ID (103) and an end-point principal intersection node ID (104) of the virtual link and a traffic volume (105) on the virtual link.

Figure 11:
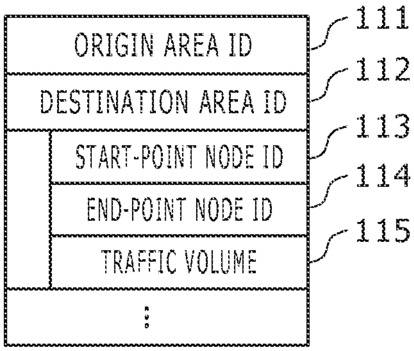
FIG. 11 is a diagram showing a data format of the traffic volume in units of road links.

The data format of the traffic volume in units of road links is shown in FIG. 11. The road link traffic volume is constituted by an origin area ID (111), a destination area ID (112), and a traffic volume with respect to each road link. The traffic volume with respect to each road link is constituted by a start-point node ID (113), an end-point node ID (114), and a traffic volume (115) on the road link.

According to the embodiments described above, the invention has the following effects.

Because the traffic-demand prediction system according to the present invention can obtain the principal intersections on the travel history of the probe car, create the simple network connecting the principal intersections, calculate the selection probability on each principal intersection based on the utility, combine the networks among the principal intersections on the simple network based on the selection probability, and distribute the traffic volume to the links in the simple network based on the selection probability, it can even predict the route which actually continues on the probe data and which has not been traveled.

LIST OF REFERENCE SIGNS

100 Traffic-demand prediction system
110 Receiver
120 Storage device
130 Simple-network creation device
140 Model creation device
150 Input device
160 Traffic-volume prediction device
170 Output device

The invention claimed is:

1. A traffic-volume prediction device that predicts a traffic volume between points using travelling locus data of a vehicle collected in advance, comprising:

a network creation device that extracts principal intersections based on a proportion of a maximum ramification number to a number passing through a traveling locus between intersections on a travel route in the travelling locus data and creates a simple network connecting the principal intersections one another, a model creation device that calculates a utility of a route between the principal intersections based on a property value between the principal intersections and estimates a parameter of a route selection model for evaluating a selection probability at each principal intersection based on the utility, and a traffic-volume assignment device that calculates the selection probability of selecting the route between the principal intersections based on the estimated parameter of the route selection model and distributes the traffic volume to the route for predicting the traffic demand based on the selection probability.

2. The traffic-volume prediction device according to claim 1, wherein the model creation device uses at least one of a travel time and a travel distance between the principal intersections obtained from the travelling locus data as the property value of the route between a principal intersection on the simple network and a plurality of principal intersections connected thereto.

3. The traffic-volume prediction device according to claim 1, wherein the traffic-volume assignment device performs a simulation in which the same number of vehicles as the traffic volume assumed from the origin point to the destination point run on the simple network at random based on the selection probability of the principal intersection, and the quantity of vehicles running between the principal intersections is assumed as a predicted traffic volume between the principal intersection or between roads.

4. The traffic-volume prediction device according to claim 3, wherein the traffic-volume prediction device obtains information including a site of occurrence of an event and influence of the site of occurrence on the traffic, and the traffic-volume assignment device updates the selection probability between a plurality of principal intersections by applying the influence on the traffic to the utility function for the principal intersections corresponding to the route passing through the site of occurrence of the event among the plurality of principal intersections, and distributes the traffic volume based on the updated selection probability.

5. A traffic-volume prediction method of predicting a traffic volume between points using travelling locus data of a vehicle collected in advance, comprising the steps of:

network creation processing of extracting principal intersections based on a proportion of a maximum ramification number to a number passing through a traveling locus between intersections on a travel route in the travelling locus data and creating a simple network connecting the principal intersections one another, model creation processing of calculating a utility of a route between the principal intersections based on a property value between the principal intersections based on the travelling locus data and estimating a parameter of a route selection model for evaluating a selection probability at each principal intersection based on the utility, and traffic-volume assignment processing of calculating the selection probability of selecting the route between the principal intersections based on the parameter of the route selection model estimated at the model creation processing and distributing the traffic volume to the route for predicting the traffic demand based on the selection probability.

6. The traffic-volume prediction method according to claim 5, wherein the model creation processing uses at least one of a travel time and a travel distance between the principal intersections obtained from the travelling locus data as the property value of the route between a principal intersection on the simple network and a plurality of principal intersections connected thereto.

7. The traffic-volume prediction method according to claim 5, wherein the traffic-volume assignment processing performs a simulation in which the same number of vehicles as the traffic volume assumed from the origin point to the destination point run on the simple network at random based on the selection probability of the principal intersection, and assumes the quantity of vehicles running between the principal intersections as a predicted traffic volume between the principal intersection or between roads.

8. The traffic-volume prediction method according to claim 7, wherein in the traffic-volume prediction method, information is obtained including a site of occurrence of an event and influence of the site of occurrence to the traffic, and the traffic-volume assignment processing updates the selection probability between a plurality of principal intersections by applying the influence on the traffic to the utility function for the principal intersections corresponding to the route passing through the site of occurrence of the event among the plurality of principal intersections, and distributes the traffic volume based on the updated selection probability.

* * * * *